US011585735B2

(12) United States Patent
Kirkby et al.

(10) Patent No.: US 11,585,735 B2
(45) Date of Patent: Feb. 21, 2023

(54) DETECTOR WITH DETECTOR INLET FOR SAMPLING GASEOUS FLUID

(71) Applicant: Smiths Detection-Watford Limited, Hertfordshire (GB)

(72) Inventors: Oliver Kirkby, Hertfordshire (GB); Alastair Clark, Hertfordshire (GB); Bruce Grant, Hertfordshire (GB)

(73) Assignee: Smiths Detection-Watford Limited, Hertfordshire (GB)

( * ) Notice: Subject to any disclaimer, the term of this patent is extended or adjusted under 35 U.S.C. 154(b) by 356 days.

(21) Appl. No.: 15/762,232

(22) PCT Filed: Sep. 30, 2016

(86) PCT No.: PCT/GB2016/053056

§ 371 (c)(1),
(2) Date: Mar. 22, 2018

(87) PCT Pub. No.: WO2017/055871

PCT Pub. Date: Apr. 6, 2017

(65) Prior Publication Data

US 2018/0266927 A1 Sep. 20, 2018

(30) Foreign Application Priority Data

Sep. 30, 2015 (GB) ...................................... 1517314

(51) Int. Cl.
*G01N 1/22* (2006.01)
*G01N 27/622* (2021.01)
(Continued)

(52) U.S. Cl.
CPC ............. *G01N 1/22* (2013.01); *G01N 1/2205* (2013.01); *G01N 1/2211* (2013.01); *G01N 1/38* (2013.01);
(Continued)

(58) Field of Classification Search
CPC ......... G01N 1/2247; G01N 2001/2223; G01N 1/2211; G01N 27/622; G01N 1/26; H01J 49/0422
See application file for complete search history.

(56) References Cited

U.S. PATENT DOCUMENTS 3,986,386 A * 10/1976 Beltzer ................ G01N 1/2247 73/863.12
4,449,816 A * 5/1984 Kohsaka .............. G01N 15/065 356/336
(Continued)

FOREIGN PATENT DOCUMENTS

CN 101076716 A 11/2007
CN 101126685 A 2/2008
(Continued)

OTHER PUBLICATIONS

International Search Report dated Dec. 23, 2016 for PCT/GB2016/053056.
(Continued)

*Primary Examiner* — Jennifer Wecker
*Assistant Examiner* — Michelle Adams
(74) *Attorney, Agent, or Firm* — Kevin E. West; Advent, LLP

(57) ABSTRACT

A detector inlet for providing a sample to an analytical apparatus for detecting an aerosol, the detector inlet comprising; an intake for inhaling a flow of gaseous fluid to be sampled by the analytical apparatus; a mixing region; a first conduit for carrying a first part of the flow of gaseous fluid from the intake to the mixing region; a second conduit for carrying a second part of the flow of gaseous fluid from the intake to the mixing region; and a heater configured to heat the first part more than the second part, and wherein the
(Continued)

detector inlet is configured to combine the first part with the second part in the mixing region.

20 Claims, 9 Drawing Sheets

(51) Int. Cl.
*G01N 1/44* (2006.01)
*H01J 49/04* (2006.01)
*G01N 1/38* (2006.01)

(52) U.S. Cl.
CPC ............ *G01N 1/44* (2013.01); *G01N 27/622* (2013.01); *H01J 49/0422* (2013.01); *G01N 2001/2223* (2013.01)

(56) References Cited

U.S. PATENT DOCUMENTS

| | | | | |
|---|---|---|---|---|
| 5,355,719 | A | 10/1994 | Kohsaka et al. | |
| 5,903,338 | A | 5/1999 | Mavliev et al. | |
| 6,467,333 | B2 * | 10/2002 | Lewis | A61B 5/00 422/84 |
| 6,567,157 | B1 * | 5/2003 | Flagan | G01N 1/2247 356/335 |
| 10,388,497 | B2 | 8/2019 | Sharp et al. | |
| 10,613,065 | B2 * | 4/2020 | Clark | G01N 33/0011 |
| 2004/0202578 | A1 * | 10/2004 | Burtscher | G01N 1/2202 356/337 |
| 2004/0227073 | A1 | 11/2004 | Krasnobaev et al. | |
| 2006/0096393 | A1 | 5/2006 | Pesiri | |
| 2009/0001028 | A1 | 1/2009 | Frisch et al. | |
| 2009/0031828 | A1 | 2/2009 | Ulevicius et al. | |
| 2010/0242455 | A1 * | 9/2010 | Konstandopoulos | F01N 13/0093 60/311 |
| 2012/0105839 | A1 | 5/2012 | Novosselov et al. | |
| 2014/0300369 | A1 * | 10/2014 | Hart | G01N 27/624 324/470 |
| 2015/0075135 | A1 * | 3/2015 | Giechaskiel | F01N 3/021 60/274 |

FOREIGN PATENT DOCUMENTS

| | | | |
|---|---|---|---|
| GB | 2166546 | A | 5/1986 |
| GB | 2530124 | A | 3/2016 |
| JP | 2007518087 | A | 7/2007 |
| RU | 2467304 | C2 | 11/2012 |
| WO | 9714033 | A1 | 4/1997 |
| WO | 0127589 | A1 | 4/2001 |
| WO | 2015019059 | A1 | 2/2015 |

OTHER PUBLICATIONS

Combined Search and Examination Report dated Jul. 15, 2016 for GB Appln. No. GB1517314.9.
Office Action for Chinese Patent Application No. 201680057175.3, dated Jun. 12, 2020.
Office Action for Japanese Patent Application No. 2018-516513, dated Jun. 30, 2020.
Office Action for Russian Patent Application No. 2018113753/05(021563), dated Feb. 28, 2020.
Office Action for Russian Patent Application No. 2018113753/05(021563), dated Jul. 24, 2020.

* cited by examiner

DETECTOR WITH DETECTOR INLET FOR SAMPLING GASEOUS FLUID

SUMMARY OF THE INVENTION

The present disclosure relates to detection methods and apparatus, and more particularly to methods and apparatus for obtaining vapour samples for detectors such as spectrometry based detectors such as ion mobility spectrometers and mass spectrometers.

Methods and apparatus are provided herein for vapourising aerosols that may be carried in gaseous fluid. Gaseous fluid may comprise aerosols, vapour and particulates. Methods are provided herein for heating that gaseous fluid to vapourise the aerosol. These methods and apparatus may find particular application in spectrometry, for example ion mobility spectrometry and mass spectrometry.

Some detectors operate by "inhaling" a stream of gaseous fluid, such as air, into a detector inlet and sampling that air with an analytical apparatus to detect substances of interest. That inhaled stream of air can be sampled from the detector inlet using a sampling inlet such as a pinhole, capillary or membrane inlet. Some analytical apparatus and particularly some ion mobility spectrometers are adapted for the analysis of vapours, and of gases. Such analytical apparatus may be configured to detect substances of interest, such as narcotics, explosives, and chemical warfare agents. Detection sensitivity, and the reliability of such detectors, may therefore be a significant issue.

Some substances of interest may comprise aerosols. By contrast with a vapour or gas, an aerosol comprises particles of solid or liquid suspended in a gas. If a substance has a low vapour pressure at ambient temperature, detectors which rely on the presence of vapour may be unable to detect an aerosol comprising that substance.

Aspects and embodiments of the present disclosure are set out in the claims and aim to address related technical problems.

BRIEF DESCRIPTION OF THE DRAWINGS

Embodiments of the disclosure will now be described, by way of example only, with reference to the accompanying drawings, in which.

In the drawings like reference numerals are used to indicate like elements.

DETAILED DESCRIPTION

Embodiments of the disclosure relate to detector inlets for providing samples to a detector for detecting a substance of interest. Detectors such as mass spectrometers and ion mobility spectrometers may be configured to ionise a vapour, and then to analyse the ions generated from that vapour to detect substances of interest. Such detectors may be configured to inhale a flow of gaseous fluid from an environment to be tested, and then to take samples from this flow. The samples can then be tested to detect the presence of substances of interest. The gaseous fluid may comprise gas, such as air, vapour and aerosols, for example solid or liquid particles suspended in the fluid.

Embodiments of the disclosure relate to heating a part of an inhaled flow more than the rest of that flow, and then mixing the heated part of the inhaled flow with the rest of the flow to vapourise aerosol carried by the rest of the flow. A sample vapour may then be taken from the mixed, heated, flow of gaseous fluid and provided to a detector.

Figure 1:
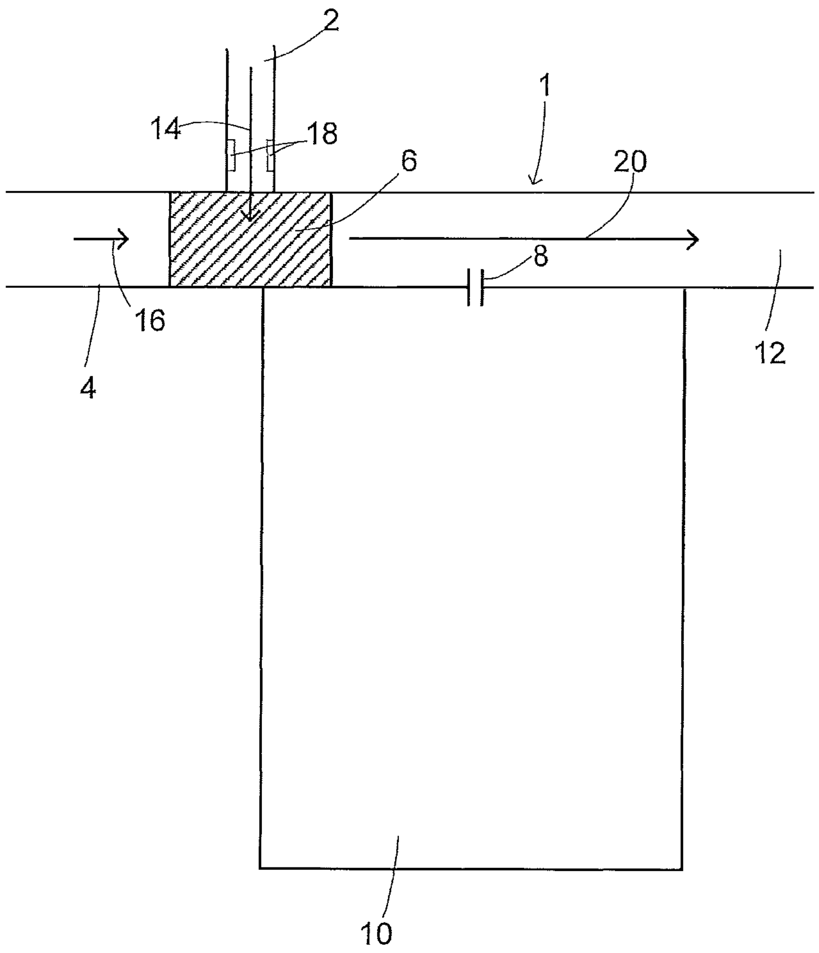
FIG. 1 shows a detector inlet coupled to a detector.

FIG. 1 shows a detector inlet 1 comprising an intake having two ports for obtaining samples of gaseous fluid from an environment. The detector inlet also comprises a first conduit 2 that links the first port to a mixing region in the detector inlet. A second conduit 4 links the second port to the mixing region 6. The first conduit and the second conduit thus provide separate paths for the flow of gaseous fluid from the environment into the mixing region in the detector inlet. For example they provide parallel (in the sense of alternative rather than necessarily geometrically parallel) separate flow paths from intake ports of the detector inlet to the mixing region. Accordingly, a first part of a flow of gaseous fluid that is drawn into the intake ports of the detector inlet can reach the mixing region by flowing through the first conduit, and a second part of the flow can reach the mixing region by flowing through the second conduit. The first part and the second part of this flow can then be recombined upon reaching the mixing region.

The detector inlet also comprises a heater 18. The heater 18 is configured to heat the first part of the flow of gaseous fluid 14 such that the first part of the flow of gaseous fluid 14 is heated more than the second part of the flow of gaseous fluid 16. For example the heater may be arranged within the first conduit, for example at least partially inside it, for example at the exit from the first conduit to the mixing region. In some such examples one or more internal walls of the first conduit may comprise the heater. The heater may comprise a resistive heater such as a filament heater, for example a membrane heater. Other examples of heaters include radiation sources such as infrared light.

The detector inlet illustrated in FIG. 1 may comprise a filter, although this is optional. If it is included, this filter is arranged for inhibiting the passage of at least some particulates carried by the first part of the flow of gaseous fluid. For example the filter may be arranged in the first conduit between the intake and the heater. The second conduit may be wider than the first conduit, for example it may have a larger flow cross section. In the mixing region 6 the first part of gaseous fluid is combined with a first part of the flow of gaseous fluid 14 carried by the second conduit 4.

The detector inlet may also comprise an exhaust 12 and a mover, such as a fan or pump. When a mover is included it may be arranged to provide a flow of gaseous fluid from the intake through the detector inlet to the exhaust. A sampling inlet 8, such as a pinhole aperture, is arranged in the detector inlet to obtain samples of the flow of gaseous fluid at a location between the exhaust and the exit from the first conduit. For example, the sampling inlet may be arranged to obtain samples from the mixing region 6. The sampling inlet is arranged for taking samples from the detector inlet and providing them into a detector so that the detector can detect substances of interest carried by the flow of gaseous fluid.

The detector inlet illustrated in FIG. 1 can be operated to prepare an aerosol for analysis by a detector for detecting whether that aerosol comprises a substance of interest. In operation therefore, a flow of gaseous fluid is taken into the detector inlet, and separated into two parts. A first part of the flow may pass along the first conduit, and a second part of the flow may pass along the second conduit. The first part of the flow can be heated more than the first part of the flow, for example so that it is hotter than the second part of the flow. The temperature of the first part of the flow may be at least hot enough to vapourise a selected substance of interest. For example, the first part of the flow may be heated to a temperature of at least 150° C., for example at least 200° C., for example at least 400° C. The first part of the flow of gaseous fluid is then mixed with the second part of the flow to heat that second part of the flow. The first part of the sample may be heated sufficiently so that the temperature in the mixing region is hot enough that aerosols of a selected substance of interest carried in the second part of the flow are at least partially vapourised. For example the heater may be operated so that the temperature of the flow in the mixing region is at least 150° C., for example at least 200° C. In an embodiment, the heater is operated so that the temperature of the gaseous fluid in the mixing region is in the range of 100° C. to 400° C.

Samples are then taken from the mixed, heated flow by the sampling inlet and provided to the detector. For example, the sampling inlet can be operated to take samples from the mixed (recombined) flow in a region where the temperature of the flow is raised due to the mixing of the first part of the flow with the second part of the flow.

Although the embodiment illustrated in FIG. 1 is explained as having two intake ports, it will be appreciated that in some embodiments the detector inlet may comprise a single, common, intake linked by the first and second conduits to the mixing region.

Figure 2:
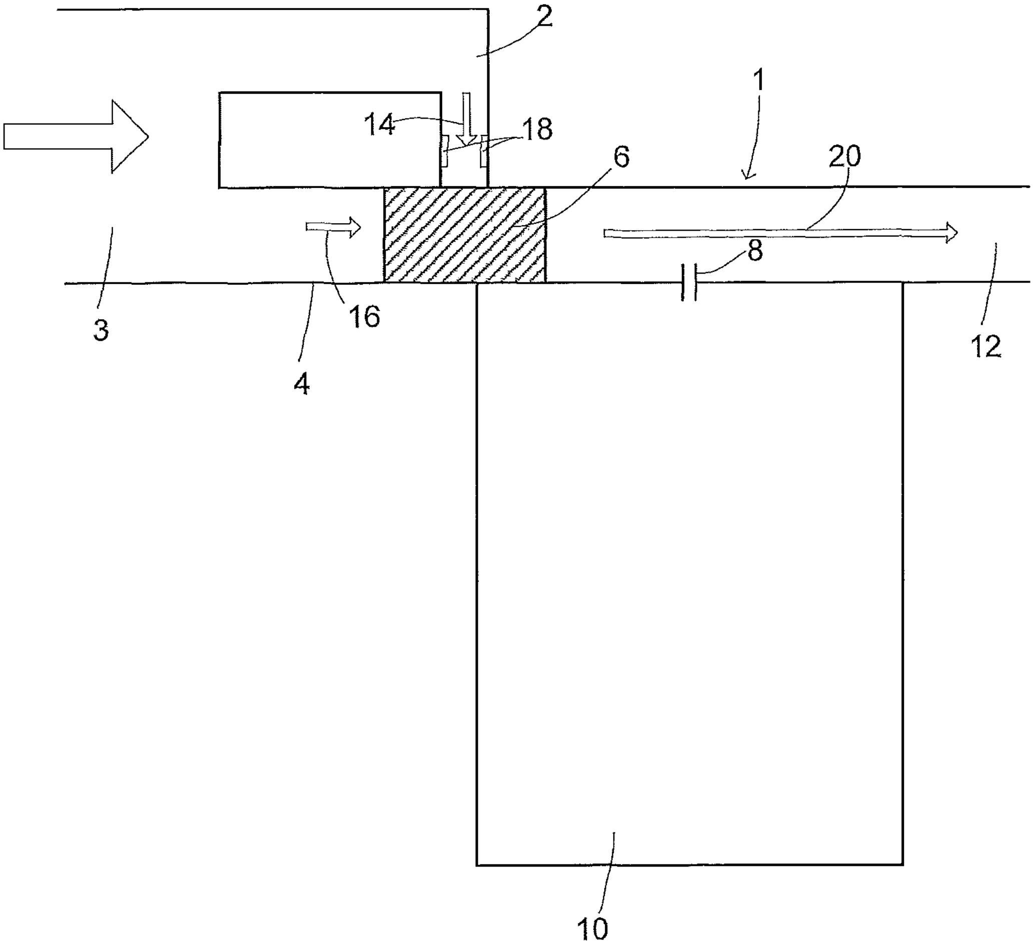
FIG. 2 shows an example of the detector inlet of FIG. 1.

One such example is illustrated in FIG. 2. As illustrated in FIG. 2, the detector inlet 3 is arranged to separate the first part of the gaseous fluid from the second part of the gaseous fluid, and to pass the first part through the first conduit. The first part of the flow can then be recombined with the second part in the mixing region. This mixing of the second part with the first part may vapourise aerosol carried by the second part.

The manner in which the two parts of the flow of fluid are recombined may be selected to promote even mixing of the two parts of the flow. For example, the first part may be provided into the second part using nozzles. These nozzles may be arranged to provide jets of heated fluid. For example the first part of the flow of heated fluid may have a higher speed than the second part of the flow. This may be achieved by providing an additional mover (e.g. a pump, bellows, or fan) for moving the first part of the flow of gaseous fluid along the first conduit.

Another way to promote mixing may be to cause the first part of the flow to be moving in a different direction from the second part of the flow. For example, it can be provided in a direction that is transverse to the second part of the flow. Particularly in the context of non-rectilinear (for example round) section flow passages, this may cause circulatory or helical flow to be established in the mixing region.

Figure 3:
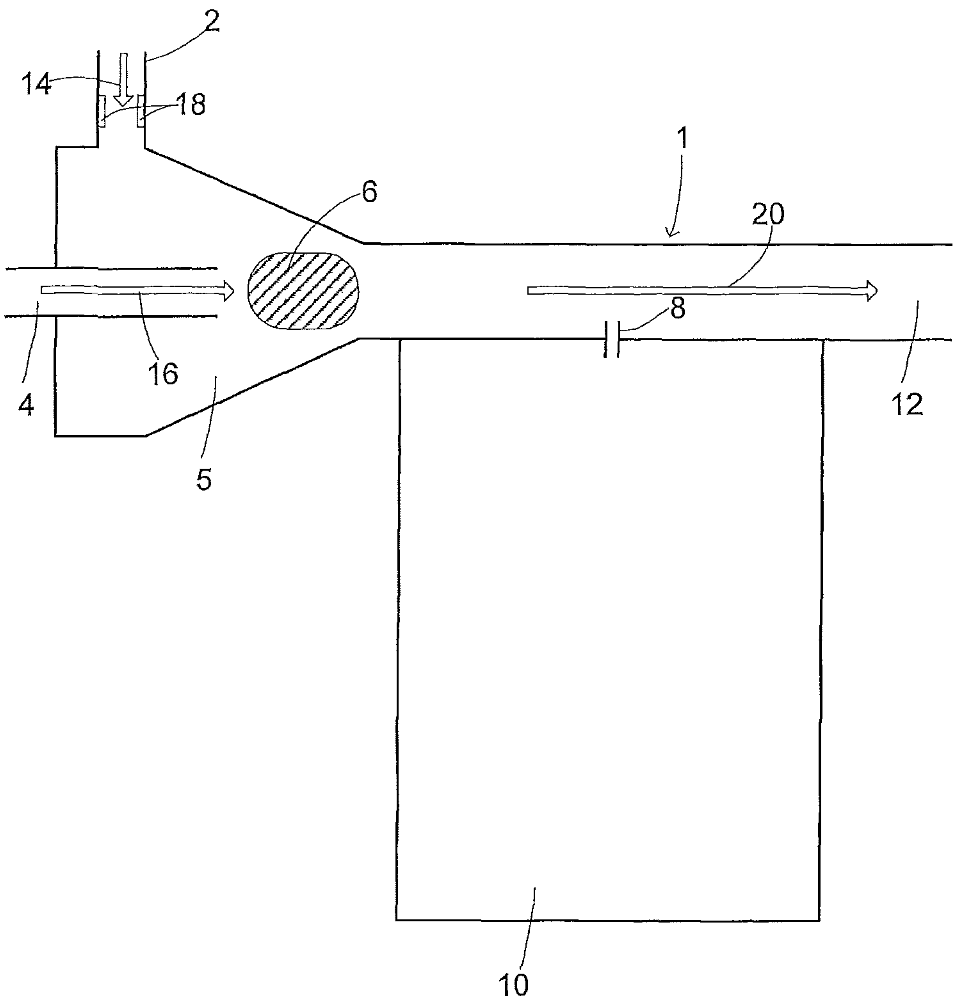
FIG. 3 shows an example of the detector inlet of FIG. 1.

One example of a detector inlet which can operate in this way is illustrated in FIG. 3. In the detector inlet 1 illustrated in FIG. 3 the detector inlet comprises a funnel portion 5. The funnel portion comprises a base and an apex with the base of the funnel wider than the apex of the funnel. The base of the funnel is coupled to the apex of the funnel via funnel walls. The first conduit 2 is located at one side of the base of the funnel and the second conduit extends from the base of the funnel along the axis of the funnel so that the fluid flows from the second conduit along the axis of the funnel. The mixing region 6, where the flow of fluid from the first conduit mixes with the flow of fluid from the second conduit, is located at the apex of the funnel.

As the flow of fluid enters the funnel from the first conduit into the funnel portion the funnel walls direct the fluid from the first conduit into a circulatory path about the axis of the funnel. The fluid in the funnel received from first conduit moves towards the apex of the funnel towards the mixing region and circulates about the axis of the funnel as it moves towards the apex of the funnel. The circulating fluid from the first conduit mixes with the fluid from the second conduit at the mixing region 6. The mixing of the heated fluid flowing in a circulatory path originating from the first conduit with the fluid from the second conduit may vapourise an aerosol carried in the fluid from the second conduit and induce a circulatory flow of the mixed fluid. The circulating heated fluid then passes from the mixing region towards the sampling inlet as described above with reference to FIG. 1 and FIG. 2.

In any of the embodiments described above, the sampling inlet 8 may be arranged to collect samples of vapour from the mixing region. That is to say, the sampling inlet may collect samples from the region of the flow of gaseous fluid in which the temperature is raised by the mixing of the two parts of the flow. For example the sampling inlet 8 may be disposed less than 50 mm downstream of the point at which the first part of the flow and the second part of the flow are mixed. For example it may be arranged less than 30 mm, for example less than 20 mm, for example less than 10 mm.

As mentioned above, at least one of the first conduit and the second conduit may be configured to provide a circulatory flow of gaseous fluid around the mixing region. The circulatory flow may encircle the sampling inlet 8. This circulatory flow may be provided using nozzles, and/or using a funnel structure as explained with reference to FIG. 3.

Such embodiments may be of particular utility when the flow of gaseous fluid comprises particulates which may clog the sampling inlet 8, or be carried into the detector 10 through the inlet to cause contamination or damage to the detector 10.

Figure 6:
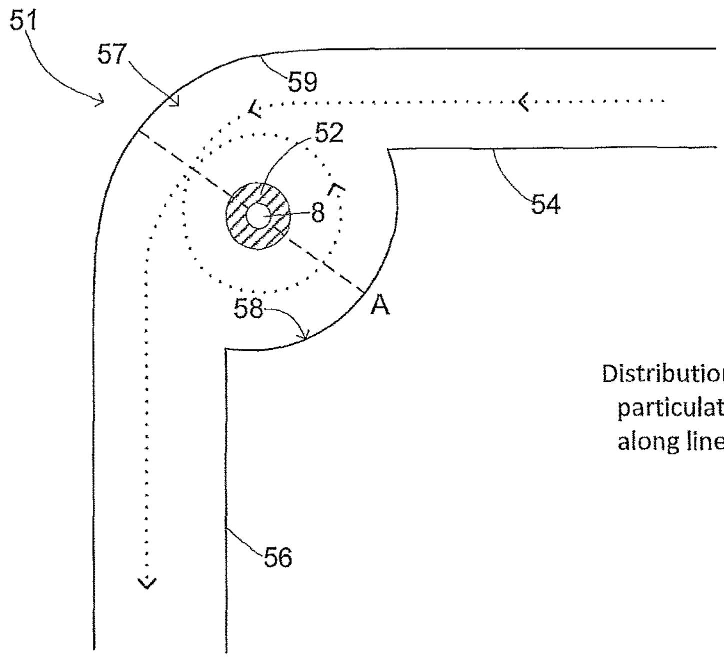
FIG. 6 shows a plan view of a section through a plenum which can be used in the detector inlets described herein.

FIG. 6 depicts an example of a detector inlet in which the mixing region is arranged in a plenum of the detector inlet. The sampling inlet 8 is arranged to take samples from a sampling volume 52 in this plenum 57. As illustrated in FIG.

6, the detector inlet comprises a flow director 51, such as a curved wall of the plenum 57 arranged to create circulatory flow of the gaseous fluid around the plenum 57 and encircling the sampling inlet 8. This circulatory flow can provide a centrifuge effect thereby to vary a spatial distribution of the particulates carried by the fluid so that more particulates are carried closer to the wall of the plenum 57 than are carried into the sampling volume 52. Vapour however may diffuse the plenum 57 and into the sampling volume 52. This may increase a relative proportion of the particulates carried past the sampling inlet 8 without entering the sampling volume 52.

FIG. 6 shows a part of a detector inlet comprising a flow inlet 54, a flow outlet 56 and a plenum 57. The flow inlet 54 to the plenum 57 may be provided by the outflow from both the first conduit and the second conduit described above with reference to any of FIG. 1, FIG. 2 and FIG. 3. As illustrated in FIG. 6, the plenum 57 comprises a curved wall having an inner surface 59. As noted above, a sampling inlet 8, such as a pinhole, is arranged to obtain samples from a sampling volume 52 in the plenum 57.

Figure 7:
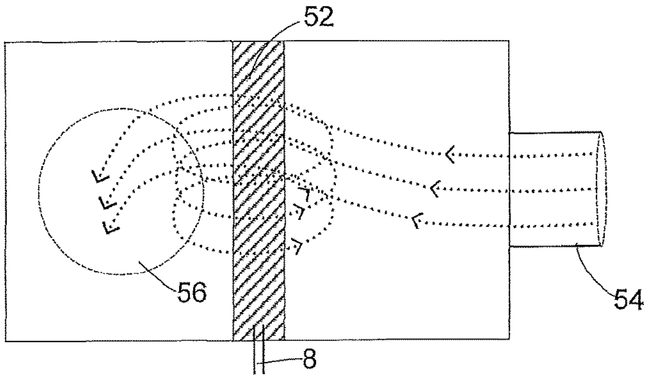
FIG. 7 shows a cross section of the plenum illustrated in FIG. 6.

FIG. 7 shows a cross sectional view of the detector inlet of FIG. 6. It can be seen in FIG. 7 that the sampling inlet 8 can be arranged to collect samples of gaseous fluid from the centre region of the plenum 57. For example, in FIG. 6 the plenum 57 is viewed in plan, with the path of inhaled flow aligned with the plane of the drawing. In this view the plenum 57 has a rounded shape, for example it is circular. The sampling inlet 8 may be arranged in the middle of this rounded shaped plenum 57, for example it may be evenly spaced from the walls of the plenum 57.

The flow inlet 54 and the flow outlet 56 illustrated in FIG. 6 are aligned in different directions. The flow inlet 54 and flow outlet 56 are both coupled to the plenum 57, which in this example therefore sits at a bend in the path of fluid through the detector inlet 1. At the plenum 57, the flow of gaseous fluid undergoes a change in direction as it flows from the flow inlet 54 through the plenum 57 to the flow outlet 56.

The detector inlet illustrated in FIG. 1, FIG. 2 or FIG. 3 may comprise a filter. This filter is arranged for inhibiting passage of at least some particulates carried by the first part of the flow of gaseous fluid. For example the filter may be arranged in the first conduit between the intake and the heater. The first part of the flow of gaseous fluid can be filtered to remove at least some of the particulates carried by the flow.

The plenum 57 comprises an internal volume bounded by the inner surface 59 of the wall. As illustrated, the surface of the wall may be curved, for example the curvature of the inner surface 59 of the wall may be arranged to provide a bend in the path of the inhaled flow from the flow inlet 54 to the flow outlet 56. As illustrated in FIG. 7, the flow cross section of the plenum 57 may be greater than the flow cross section of the flow inlet 54. In this context the flow cross section refers to the area transverse to the direction of flow of the gaseous fluid. For example, the plenum 57 may provide a broadening of the flow path where the flow inlet 54 meets the plenum 57. This may act to slow the flow of gaseous fluid as it enters the plenum 57. In the illustration of FIG. 7, the flow outlet 56 is shown in plan as having a greater flow cross section than the flow inlet 54. This is one way to provide a slower flow speed in the gaseous fluid flowing out from the plenum 57 at the flow outlet 56. Providing slower flow speed at the outlet may promote the creation of a circulatory flow around the plenum 57.

As explained above, the flow inlet 54 is arranged to direct the gaseous fluid into the plenum 57. The plenum 57 comprises a first flow path around the outside of the bend provided by the plenum 57 past one side of the sampling inlet 8, and a second flow path back around the inside of the bend 58, past the other side of the sampling inlet 8. Thus, by positioning the sampling inlet 8 in or near the middle of the plenum 57, a circulatory flow of fluid can be induced that encircles the sampling inlet 8. This circulatory flow may vary a spatial distribution of the particulates carried by the fluid to increase a relative proportion of the particulates carried past the sampling inlet 8 without entering a sampling volume 52 from which the sampling inlet 8 obtains samples. The flow outlet 56 may be arranged so that the flow of gaseous fluid leaves the plenum 57 at a lower speed than it enters through the flow inlet 54. For example the flow outlet 56 may present a larger flow cross section to enable the same volume flow rate of gaseous fluid to flow through the outlet as through the inlet, but at a lower speed (e.g. a lower velocity as opposed to a lower flow rate). This may increase the tendency of the gaseous fluid to flow back past the sampling inlet 8 on the inside of the bend 58. For example, in such embodiments fluid may flow into the plenum 57, the flow then curves around one side of the sampling inlet 8, be inhibited from completely entering the flow outlet 56 by the slow flowing fluid at the flow outlet 56, and at least partially recirculates in the plenum 57 by flowing back past the sampling inlet 8 on the other side of the sampling inlet 8. This may provide a circulatory flow that circulates about an axis that is transverse to the direction of flow through the plenum 57.

In operation of the apparatus of FIG. 6, a flow of gaseous fluid is inhaled and passed through the first conduit and the second conduit. The first part of the flow is heated more than the second part before the outflow from these two conduits is mixed e.g. by flowing into the plenum 57 (as noted above, the first conduit and the second conduit may provide flow into the plenum via the flow inlet 54). This mixed, heated, flow flows through the plenum 57 to the flow outlet 56. The plenum 57 provides a change in direction of this flow of inhaled gaseous fluid, for example a bend in the direction of flow from the flow inlet 54. The outside of this bend is provided by the wall of the plenum 57 which is curved. This changes the direction of flow of inhaled fluid, and bends the flow of fluid around the sampling inlet 8 as it flows through the plenum 57. As it reaches the flow outlet 56, some of the gaseous fluid leaves the plenum 57 through the flow outlet 56, some however flows past the flow outlet 56 and remains in the plenum 57, so is guided back past the other side of the sampling inlet 8, on the inside of the bend 58, rather in the manner of an eddy current in a stream. When it has flowed back past the sampling inlet 8 again to return to the flow inlet 54, this back flow may then re-join further flow arriving in the plenum 57 at the flow inlet 54. This same cycle thus begins again, and some of this re-joined flow is recirculated, whilst some leaves through the outlet 4. Accordingly, for at least part of the flow of gaseous fluid, such embodiments may increase the dwell time of the gaseous fluid around the sampling inlet 8 as compared to the same flow along a straight pipe of constant cross section.

At least a portion of the fluid may thus flow in around the plenum 57, in a curved, for example at least partially circular flow path surrounding the sampling inlet 8, before exiting the plenum 57 via the flow outlet 56. It can be seen in FIG. 7 that this circulatory flow circulates about a rotation axis that is transverse to, for example perpendicular to, the bulk flow direction of the gaseous fluid through the inlet and outlet.

This circulatory flow may provide centrifuging effect around the sampling inlet 8 which tends to cause the particulates carried by the flow to move towards the walls of the plenum 57, e.g. away from the sampling inlet 8. This provides a region towards the axis of rotation of the circulatory flow in which the proportion of particulates in the gaseous fluid is depleted with respect to other regions of the gaseous fluid flow e.g. region of the fluid flow that are closer to the walls of the plenum 57. Vapour carried by the flow however remains free to diffuse around the plenum 57, and into this depleted region. Methods of the disclosure therefore comprise collecting samples of the gaseous fluid from this depleted region to reduce the number of particulates that may clog the sampling inlet 8 or enter through the inlet and thus contaminate the detector.

Figure 8:
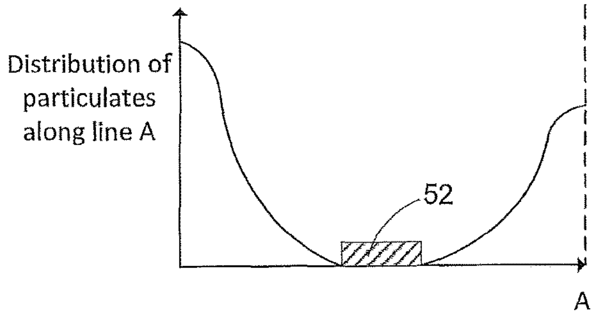
FIG. 8 illustrates a distribution of particulates carried by a flow of gaseous fluid through the plenum of FIG. 6 and FIG. 7.

A distribution of the particulates along line A, as illustrated in FIG. 6, and the sampling volume 52 is illustrated in the plot in FIG. 8. As shown in FIG. 8 the number of particulates (e.g. the number per unit volume) decreases as a function of distance from the surface of the wall. For example the number of particulates is lower towards the sampling volume 52 and away from the inside of the bend 58. As described above, the centrifuge effect causes the particulates to move towards the walls of the plenum 57 and this movement leads to the change in the number of particulates with distance from the wall towards the sampling volume 52. The distribution of particulates illustrated in FIG. 8 shows a smaller number of particulates in the region between the inside of the bend 58 and the sampling volume 52 relative to the region between the surface of the wall and the sampling volume 52. Without wishing to be bound by any particular theory, it is believed that a portion of the fluid in the region between the surface of the wall and the sampling volume 52 passes into the region between the inside of the bend 58 and the sampling volume 52, therefore the fluid between the inside of the bend 58 and the sampling volume 52 may have undergone a greater centrifuge effect and therefore may comprise fewer particulates. It will be appreciated however that such a distribution is merely an example.

The curvature of the wall may be selected to reduce the impaction of the particulates on internal surfaces of the detector inlet 1. For example, the radius of curvature of the wall may differ in different parts of the wall to provide a smooth path for the flow of fluid. For example, a first part of the wall adjacent the flow inlet 54 and a second part of the wall adjacent the fluid outlet 56 both have a larger radius of curvature than the portion of the wall coupling the first portion to the second portion. The change in the radius of curvature leads to a gradual change in the direction of flow of the inhaled gaseous fluid. This may reduce the tendency of particulates and aerosols carried by the gaseous fluid to impact on and accumulate on the wall of the plenum.

Figure 9:
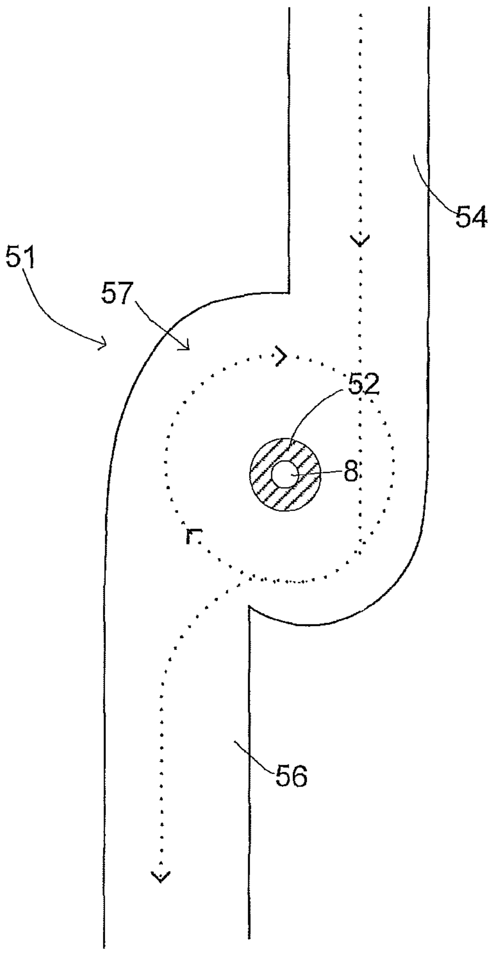
FIG. 9 shows a plan view of a section through another plenum which can be used in the detector inlets described herein.

FIG. 9 shows an example of a detector inlet such as that described above with reference to FIG. 6. In FIG. 9 however, the flow inlet 54 is aligned in the same direction as the fluid outlet 56. The flow outlet 56 however is offset from the flow inlet 54. In the example illustrated in FIG. 9, the flow outlet 56 is spaced laterally from the flow inlet 54, e.g. it is spaced in a direction transverse to the direction of the fluid flow. In this example, at least a portion of the fluid may flow in circles around the plenum 57, surrounding the sampling inlet 8, before exiting the plenum 57 via the flow outlet 56 in a direction parallel to the flow inlet 54. In the example illustrated in FIG. 9 the flow outlet 56 is located on an opposing side of the plenum 57 to the flow inlet 54. The gaseous fluid may therefore flow out of the plenum 57 via the flow outlet 56 in the same direction as it flows into the plenum 57 from the flow inlet 54. In other embodiments however, the flow outlet 56 may also be located on the same side of the plenum 57 as the flow inlet 54. For example, the plenum 57 may be located at the turn in a U-bend. These and other examples provide a circulatory flow which rotates about an axis which is transverse to the direction of flow of the gaseous fluid.

Other configurations of detector inlets may also be provided. The circulatory flow of fluid in the plenum 57 may also circulate about an axis aligned to the flow direction. This may be provided by the funnel construction described above with reference to FIG. 3. Other configurations may also be used. For example, the plenum 57 in which the mixing of the first part of the flow and the second part of the flow takes place may comprise a conduit or flow passage, such as a cylinder, arranged so that fluid can flow along it.

In such configurations, the axis of rotation of the circulatory flow may be aligned with a longitudinal axis of the flow passage. One such example is illustrated in FIG. 10.

Figure 10:
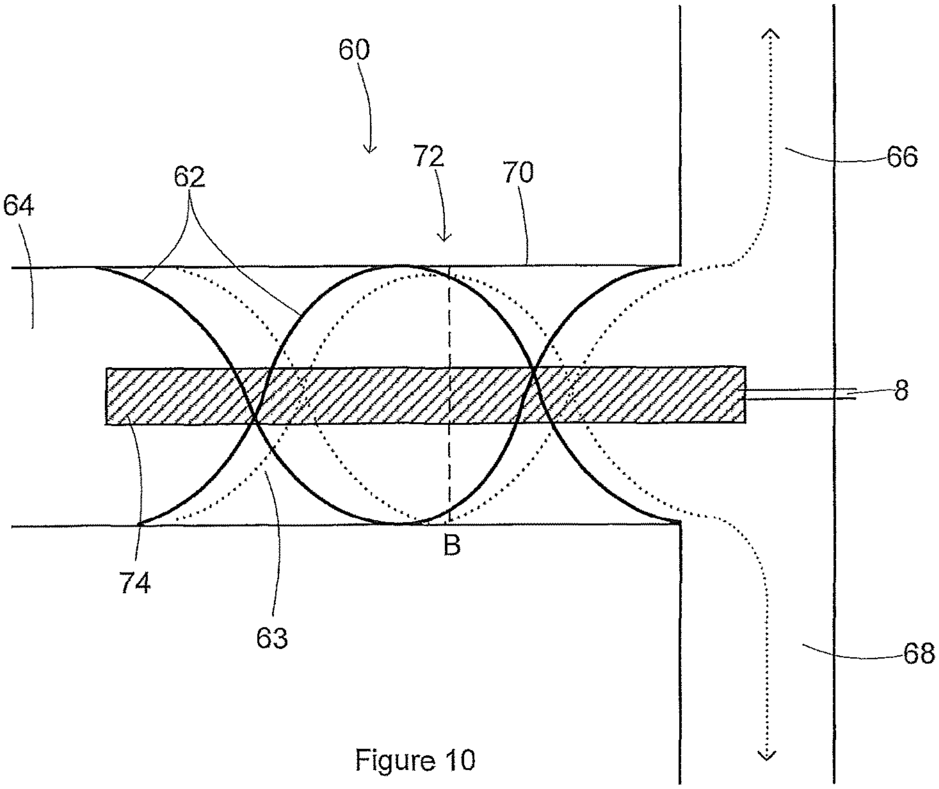
FIG. 10 shows a schematic illustration of a detector inlet having a cylindrical flow passage.

In the example illustrated in FIG. 10, the mixing region, where the heated fluid from the first conduit and the second conduit are mixed is arranged in a flow passage 72. The flow passage 72 is arranged to provide a circulatory flow which rotates about an axis that is parallel with the direction of flow of the gaseous fluid. As explained above, this circulatory flow can provide a variation in the spatial distribution of particulates in the flow so that relatively more of them are carried by the flow nearer the wall 70 of the flow passage 72. The number of particulates also decreases as a function of spacing from a wall 70 of the flow passage 72.

Figure 12:
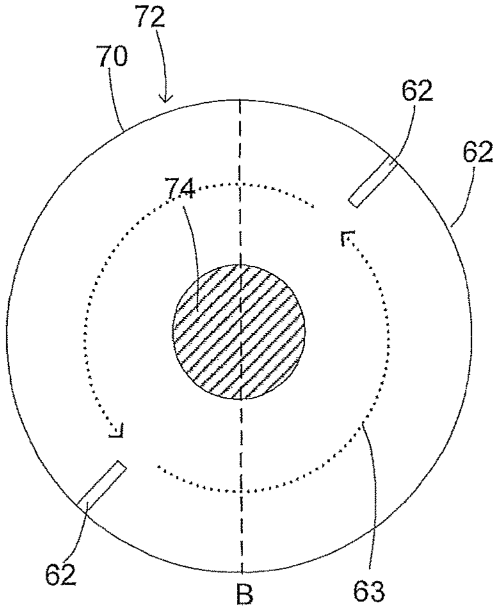
FIG. 12 shows a cross section of the detector inlet of FIG. 10 at the line 'B' in FIG. 10.

In more detail, FIG. 10 shows a detector inlet having a flow passage 72, a flow inlet 64, a first flow outlet 66 and a second flow outlet 68. The flow passage 72 comprises a wall 70, a flow director in the form of fins 62 arranged on the inner surface of the wall 70 of the flow passage 72, a sampling volume 74 and a sampling inlet 8. FIG. 12 shows a cross section of the flow passage 72 of FIG. 10, taken at the line marked B in FIG. 10.

In the example illustrated in FIG. 10 and FIG. 12, the flow passage 72 comprises a conduit such as a channel cut into a block of material and enclosed or such as a pipe or tube. The flow passage 72 defines the bulk flow direction. The flow inlet 64 may comprise a part of this flow passage 72. The first flow outlet 66 and second flow outlet 68 are separated along the flow passage 72 from the flow inlet 64 and extend from the trunk in a direction away from the axis of the trunk. For example, the flow outlets 66, 68 may branch out from the flow passage 72. For example they may be arranged at an angle to the flow passage 72. They are illustrated as being arranged transverse to (e.g. perpendicular to) the flow passage 72, but in some embodiments they may be at least partially aligned with the direction of the flow passage 72. For example the flow passage 72 and the flow outlets may be arranged in a Y-shape. In the example illustrated in FIG. 10, the first flow outlet 66 and the second flow outlet 68 extend from the trunk in different directions, for example the first flow outlet 66 may be arranged to carry a flow of gaseous fluid in an opposite direction to the flow of fluid carried by the second flow outlet 68.

In FIG. 10, the flow director comprises a fin, or fins 62, that extend from the interior wall 70 of the flow passage 72. The fin or fins 62 may be aligned with a helical path in the manner of a screw thread around and along the flow passage 72. To act as a flow director, this fin (or fins) 62 are in the path of at least a portion of the fluid flowing through the flow passage 72. In the example illustrated, the flow director is in the form of two fins 62 that are coupled to the wall 70 of the flow passage 72. A single fin, or a greater number of fins 62, may also be used. The fins 62 need not be continuous, provided that they comprise thin, elongate, structures which are aligned with at least part of a helical (e.g. corkscrew) path along the flow passage 72. The fin (or fins) 62 may be carried by the interior wall 70 of the flow passage 72 along a helical path with the axis of the helix being aligned with the flow passage 72, for example the helical path may be coaxial with the flow passage 72. The fins 62 may be fixed to the wall 70 of the flow passage 72, for example the flow passage 72 may be integrally formed with the fins 62. The fins 62 may extend at least 10 micron from the wall 70 of the flow passage 72.

The flow passage 72 is arranged to receive a sample from the flow inlet 64. The fins 62 on the inner surface of the wall 70 of the flow passage 72 are arranged to alter the flow direction of the fluid so that the fluid flows with a circulatory flow 63 having an axis of rotation that is aligned with the bulk flow direction in the flow passage 72. The sampling inlet 8 is arranged to obtain samples from the sampling volume 74, for example as illustrated in FIG. 10 the sampling inlet 8 may be located in the centre of the sampling volume 74.

FIG. 12 shows a cross sectional view of the flow passage 72 of FIG. 10. FIG. 12 shows the sample volume being coaxial with the flow passage 72 and encircled by the flow of fluid 20. The flow path 63 is illustrated in FIG. 10 and FIG. 12 with the circulatory flow of the fluid following the inner surface of the wall 70 and directed in an anti-clockwise direction by the fins 62.

In operation the gaseous fluid is inhaled through the flow inlet 64 through the flow passage 72 and out of the first fluid outlet 66 and the second fluid outlet 68. The flow director that extends from the interior wall 70 of the flow passage 72 changes the direction of the flow of gaseous fluid through the flow passage. As the fluid moves along the flow passage the change in direction provides a rotation to the fluid so that the flow of fluid encircles the axis of the flow passage, for example in the manner that rifling of a gun barrel induces a circulatory motion to a bullet travelling along the barrel. The gaseous fluid continues to rotate about the axis of the flow passage whilst travelling towards the first fluid outlet 66 and the second fluid outlet 68. The gaseous fluid then exits the flow passage via the first fluid outlet 66 and the second fluid outlet 68.

The circulatory fluid flow path 63 illustrated in FIG. 10 and FIG. 12 is a helical flow path having an axis corresponding to the flow direction along the flow passage. The flow path may be provided by the arrangement of fins 62. In addition, or as an alternative, the flow of gaseous fluid from at least one of the first conduit (reference from FIG. 1) and the second conduit may be directed along such a path 63 in the flow passage 72 e.g. using a jet or nozzle. In the arrangement illustrated in FIG. 10 and FIG. 12 the fins 62 are arranged on the surface of the flow passage with the fins oriented to form a helical pattern having an axis that is coaxial with the axis of the flow passage. The fluid is therefore directed in a helical path, following the orientation of the fins 62, along the flow passage 72. In the example illustrated in FIG. 10 and FIG. 12 the fins are arranged in an anti-clockwise helix with respect to the fluid flow and therefore as the fluid flows along the flow passage the fluid fins rotate the fluid in an anti-clockwise direction.

The circulatory flow of the fluid in the flow passage may vary a spatial distribution of the particulates carried by the fluid. As described above the circulatory flow may increase the relative proportion of particulates carried past the sampling inlet 8 without entering the sampling volume 74 with the centrifuging effect of the circulatory flow causing the particulates to move towards the walls of the flow passage 72. The movement of the particulates towards the walls leads to a lower proportion of particulates, and therefore a greater proportion of vapour, in the sampling volume.

In the example illustrated in FIG. 10 the nature of the circulatory flow of the fluid is determined by the arrangement of the fins 62. For example, the number of times the fluid encircles the axis of the flow passage 72 for a given length of the flow passage 72 is determined by the position of the fins 62 on the wall 70 of the flow passage 72. An arrangement of the fins having a larger number of rotations along the length of the flow passage 62, for example the fins being arranged in a helix with a smaller pitch, may lead to a larger number of cycles of the fluid about axis of the flow passage as the gaseous fluid travels along the length of the flow passage.

Figure 11:
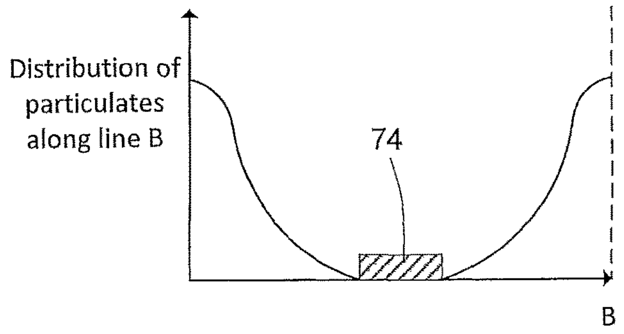
FIG. 11 illustrates a spatial distribution of particulates along the line 'B' in FIG. 10.

The distribution of the particulates along line B and the sampling volume 24 is illustrated in the plot in FIG. 11. As shown in FIG. 11 the number of particulates decreases from the wall 70 of the flow passage to the sampling inlet. As described above, the centrifuge effect causes the particulates to move towards the walls 70 and this reduces the number of particulates in the sampling volume 74 that is positioned towards the axis of the flow passage 72.

The sampling inlet 8 may be coupled to the detector inlet 1 and adapted for collecting samples of the fluid from a sampling volume 74, 52 around the sampling inlet 8. The sampler (not shown) is configured to draw a selected volume of fluid, smaller than the sampling volume 74, 52, through the sampling inlet 8 to provide a sample to the analytical apparatus. The sampler may comprise an electromechanical actuator, for example a solenoid driven actuator, and/or a mechanical pump arranged to transfer vapour from the sampling volume 74, 52 through the sampling inlet 8 and into the analytical apparatus.

Figure 4:
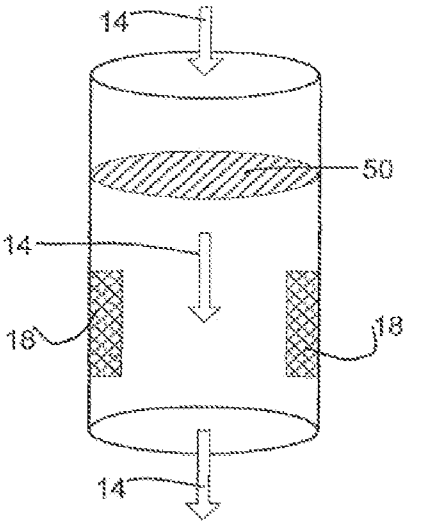
FIG. 4 shows an illustration of a fluid conduit suitable for use in the detector inlets shown in FIG. 1, FIG. 2, and FIG. 3.

As illustrated in FIG. 4, in some examples the first conduit may comprise both a filter 50 and a heater 18. The fluid flows into the conduit from a port through the filter 50 towards the heater 18. The fluid then passes via the heater into the detector inlet. The filter may comprise a mesh such as a grid or a tangled knit of filaments. Such filters may be configured to inhibit the passage of particulates having a particle size of at least 0.5 micron.

The heated first part of the flow of gaseous fluid flows into the mixing region 6 and mixes with second part of the flow of gaseous fluid to raise the temperature of the mixed fluid relative to the temperature of the second part of the flow of gaseous fluid. This mixing may take place in the flow passage 72 depicted in FIG. 10. In addition to, or as an alternative to the fins 62, one or both of the first part of the flow and the second part of the flow may be provided into the flow passage 72 in a direction selected to provide circulatory flow around the walls 70 of the flow passage 72. For example one or both parts of the flow may be provided at a diagonal (e.g. at an angle to the axis of the flow passage 72) and along an internal wall 70 of the flow passage 72, which may be cylindrical. Accordingly, the flow may spiral along the passage circulating around an axis which is aligned with the direction of bulk flow along the passage.

As noted above, the first conduit and the second conduit may provide flow of gaseous fluid into the flow passage 72.

Because the first part of the flow is heated, the increase in the temperature of the second part of the flow may lead to the vapourisation of an aerosol carried by the second part of the flow of gaseous fluid. The circulatory flow around the flow passage 72 (or the plenum 57 as the case may be) serves two purposes. On the one hand it may serve to at least marginally increase the dwell time of the gaseous fluid in the region of the sampling volume 74, and on the other hand the centrifuge effect it provides as it encircles the sampling inlet 8 serves to inhibit contamination and clogging of the sampling inlet 8.

In the example illustrated in FIG. 1 the heater 18 is a filament heater configured to heat the flow of gaseous fluid passing the filament heater in the first conduit 2. Other kinds of heater may be used. The vapourisation temperature of the gaseous fluid is dependent upon the composition of the gaseous fluid. For example, a fluid comprising chemicals that vapourise at a lower temperature may require the temperature in the mixing region 6 to be lower in order to generate a vapour from an aerosol in the gaseous fluid. The temperature in the mixing region may be controlled by altering the rate of flow of the first part of the flow of gaseous fluid and/or the temperature of the first part of the flow of gaseous fluid.

In an example a controller is coupled to the heater 18 to control the heating power of the heater in order to change the temperature of the first part of the flow of gaseous fluid. The controller may also be configured to control the flow rate of the fluid through the first conduit. Altering the flow rate will change the amount of time the fluid is in contact with the heater, altering the temperature of the gaseous fluid, and change the volume of fluid entering the mixing region from the first conduit. Increasing the volume of fluid entering the mixing region from the first conduit will increase the proportion of fluid from the first conduit relative to the fluid from the second conduit, and increase the temperature of the fluid in the mixing region.

Figure 5:
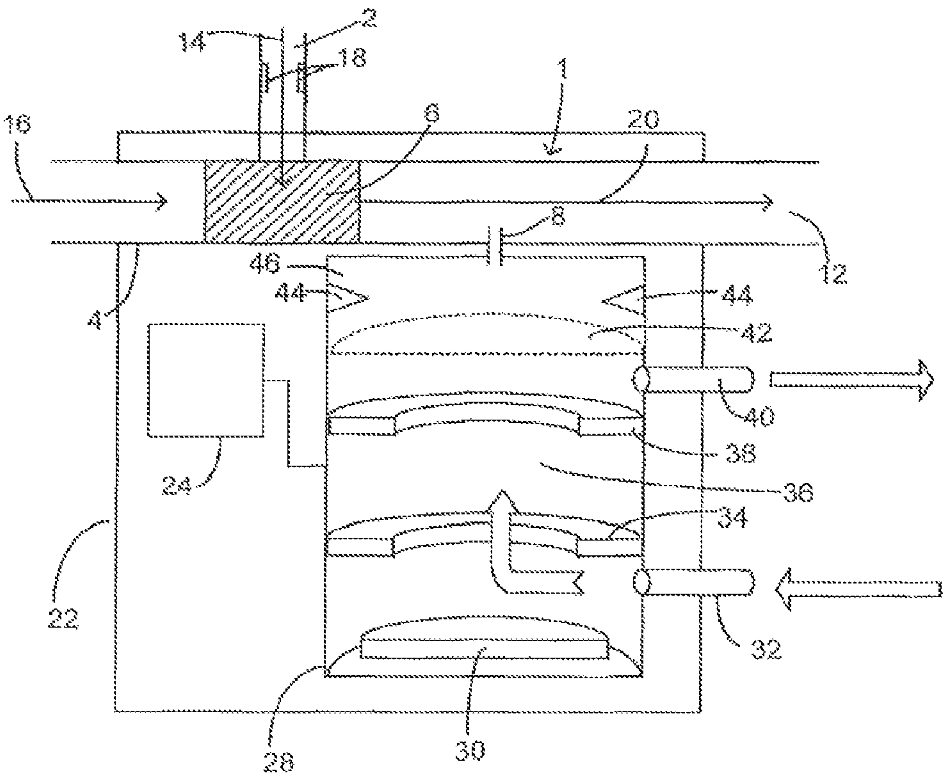
FIG. 5 shows a schematic section view of an ion mobility spectrometer coupled to a detector inlet such as shown in FIG. 1, FIG. 2, or FIG. 3.

FIG. 5 shows an apparatus 22 comprising a spectrometer 28. The spectrometer 28 is coupled to the detector inlet 1 of FIG. 1.

In FIG. 5, the spectrometer 28 comprises an ion mobility spectrometer which is coupled to the detector inlet 1 by a sampling port 8, and comprises a reaction region 46 in which a sample can be ionised. The sampling port 8 can be operated to obtain a sample from the inlet into the spectrometer 28.

As in FIG. 5, a gate electrode assembly 42 may separate the reaction region 46 from a drift chamber 36. The drift chamber 36 comprises a detector 30 toward the opposite end of the drift chamber 36 from the gate electrode assembly 42. The drift chamber 36 also comprises a drift gas inlet 32, and a drift gas outlet 40 arranged to provide a flow of drift gas along the drift chamber 36 from the detector 30 towards the gate 42.

The sampling port 8 can be operated to sample air from the inlet 1 into the reaction region 46 of the spectrometer 28. The reaction region 46 comprises an ioniser 44 for ionising a sample. In the example shown in FIG. 5 the ioniser 44 comprises a corona discharge ioniser comprising electrodes.

The drift chamber 36 also comprises drift electrodes 38, 34, for applying an electric field along the drift chamber 36 to move ions towards the detector 30 against the flow of the drift gas.

In an embodiment, the controller 24 is configured to control the sampling port 8 to obtain at least one initial sample from the inlet during the selected time period, and to analyse the initial sample to test for the presence of residues. Based on this test, the controller 24 may extend or shorten the selected time period.

Figure 13:
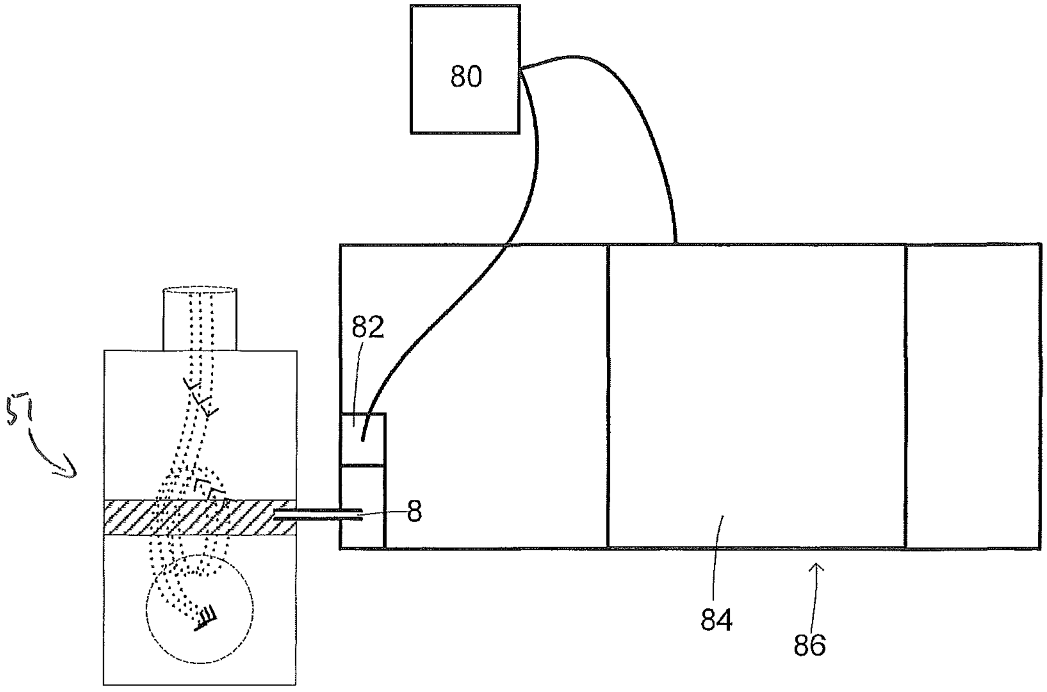
FIG. 13 illustrates an example of a detector with the detector inlet of FIG. 6.
Figure 14:
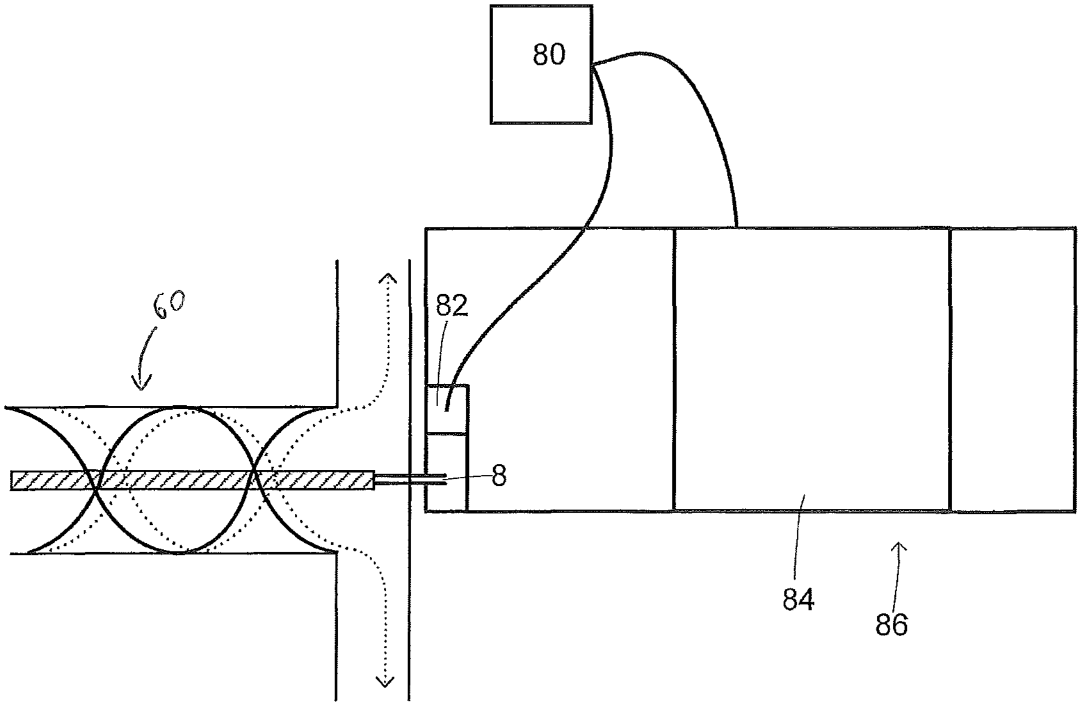
FIG. 14 illustrates an example of a detector with the detector inlet of FIG. 10.

FIG. 13 shows a detector 86 coupled to the detector inlet 51 via the sampling inlet 8 and FIG. 14 shows a detector 86 coupled to the detector inlet 60 via the sampling inlet 8. The detector 86 comprises a sampler 82 arranged to obtain samples of the fluid via the sampling inlet 8 and an analytical apparatus 84.

The analytical apparatus 84 is configured to analyse the sample received from the sampling inlet 8, for example to determine one or more chemicals of interest in the sample. The analytical apparatus 84 shown in FIG. 13 and FIG. 14 comprises a mass spectrometer. A mass spectrometer may comprise an ioniser, an ion accelerator, a beam focusser, a magnet, and a faraday collector arranged to perform mass spectrometry analysis on samples of vapour.

As illustrated in FIG. 13 and FIG. 14, a controller 80 is coupled to control the analytical apparatus, the flow provider and the sampler 82. The controller 80 may comprise a processor and a memory storing instructions for operation of the detector 86.

Figure 15:
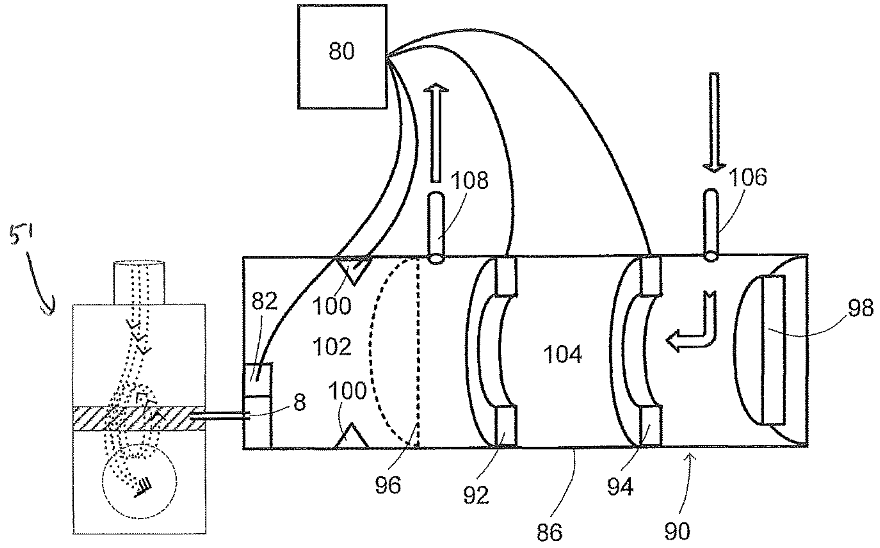
FIG. 15 illustrates another example of a detector with the detector inlet of FIG. 6.
Figure 16:
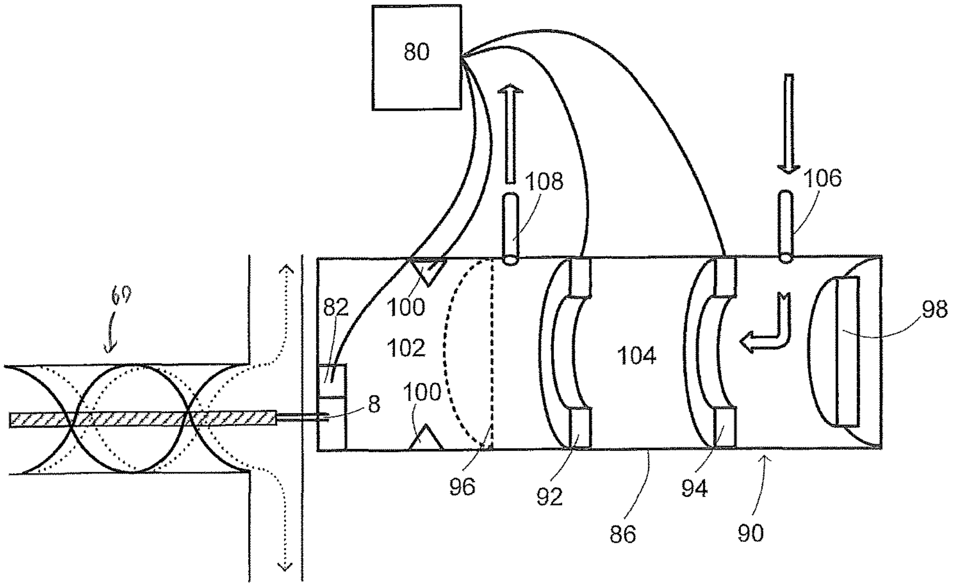
FIG. 16 illustrates another example of a detector with the detector inlet of FIG. 10.

FIG. 15 and FIG. 16 shows a detector 86 in which the analytical apparatus comprises an ion mobility spectrometer 90 but which is otherwise identical to the apparatus shown in FIG. 13 and FIG. 14. The ion mobility spectrometer 90 of FIG. 15 is coupled to a detector inlet 51 by a sampling inlet 8. The sampler 82 is arranged to obtain samples of the fluid through the sampling inlet 8 and to provide them to the ion mobility spectrometer 90. As in the example of FIG. 13 and FIG. 14, the controller 80 may comprise a processor and a memory storing instructions for operation of the detector 86. Also as in FIG. 13 and FIG. 14, the sampler 82 may comprise an electromechanical actuator, for example a solenoid driven actuator, and/or a mechanical pump arranged to transfer vapour from the sampling volume 52, 74 (as illustrated in FIG. 6, FIG. 7, FIG. 8, FIG. 9, FIG. 10, FIG. 11 and FIG. 12) through the sampling inlet 8 into the analytical apparatus.

A gate electrode assembly 96 may separate the reaction region 102 from a drift chamber 104. The gate electrode assembly 96 may comprise an assembly of at least two electrodes, which may be arranged to provide a Bradbury-Nielsen or Tyndall-Powell gate. The drift chamber 104 can comprise a collector 98 toward the opposite end of the drift chamber 104 from the gate electrode assembly 96 for detecting ions. The drift chamber also comprises a drift gas inlet 106, and a drift gas outlet 108 arranged to provide a flow of drift gas along the drift chamber 38 from the ion collector 32 towards the gate 96. The sampler 82 can be operated by the controller 80 to obtain fluid from sampling volume 52, 74 (as illustrated in FIG. 6, FIG. 7, FIG. 8, FIG. 9, FIG. 10, FIG. 11 and FIG. 12) through the sampling inlet 8. The sampler 82 can also be operated to provide an obtained sample into the reaction region 102 of the spectrometer 68. The reaction region shown in FIG. 15 and FIG. 16 comprises an ioniser 100 for ionising a sample. The ioniser 100 may comprise a corona discharge ioniser. The drift chamber 104 may comprise drift electrodes 92, 94 for applying an electric field along the drift chamber 104 to move ions towards the collector 98 against the flow of the drift gas.

Although the apparatus of FIG. 15 and FIG. 16 is illustrated as comprising two drift electrodes 92, 94, some embodiments may comprise more than two drift electrodes.

As explained above, detector inlets of the present disclosure find particular application in portable devices which may be used in hostile environments where dust and contaminants are prevalent. These detector inlets may be used with a variety of analytical apparatus, such as the mass spectrometer of FIG. 13 and FIG. 14 and the ion mobility spectrometer 90 of FIG. 15 and FIG. 16, other kinds of analysers, spectrometers and/or chromatography apparatus. In addition, the detector inlet 51, 60 may have different configurations.

In some examples described above, the flow director comprises a single flow inlet and a single flow outlet. In other examples the flow director may comprise more than one flow inlet and more than one flow outlet. In an example the flow director comprises more flow outlets than flow inlets. The flow cross section of these inlets and outlets may be selected so that the total flow cross section of the flow outlets is greater than the total flow cross section area of the flow inlet (or inlets).

In the examples illustrated above, the surface of the flow director directs the flow of fluid to induce circulatory flow in the fluid. The flow director may also comprise an additional fluid path configured to direct additional gaseous fluid into the flow to create the circulatory flow. The additional fluid path may comprise one or more jets of fluid that are arranged to introduce fluid into the flow director altering the flow path of the fluid to create circulatory flow of the gaseous fluid.

In the example illustrated in FIG. 10 and FIG. 12 the fins 62 are arranged on the wall 70 of the flow passage 72 in a helical arrangement so that the flow of the fluid is in a helical path along the flow passage 72. The fins 62 may be arranged on the surface in a pattern other than a helical pattern to induce circulatory motion of the fluid along the flow passage 72 in a path that is not helical, for example the fins 62 may be at least partially tapered, for example into a cone shaped spiral. The fins 62 are arranged to direct the fluid in an anti-clockwise helical path, the fins 62 may also be arranged in a clockwise helical pattern so that the fluid flows in a clockwise helical path.

In the example illustrated in FIG. 10 and FIG. 12 the fins 62 are arranged on the wall 70 of the flow passage 72. The helical pattern may have a uniform pitch along the length of the helix. The helix may extend along at least a part of the flow passage 72, for example all of the flow passage 72. The pitch of the helical fins 62 may also vary along the length of the flow passage 72, for example the pitch of the fins 62 may be reduced in a portion of the flow passage 72 so circulatory flow is such that the fluid undergoes more rotations about the axis of the flow passage 72 for a given length of the flow passage 72.

In the example illustrated in FIG. 10 and FIG. 12 the flow director comprises fins 62 that extend from the wall 70 of the flow passage 72. The flow director may also comprise a groove in the wall 70 of the flow passage 72 to direct the fluid in a circulatory path, for example the groove may be an indented region on the wall 70 of the flow passage 72, for example in the manner of a screw thread in a nut.

In the example illustrated in FIG. 10 and FIG. 12 the fins extend from the wall 70 of the flow passage 72. The fins may also extend from another part of the flow passage, for example the fins may extend from the flow inlet and/or flow outlet into the flow passage.

In the example illustrated in FIG. 10 and FIG. 12 the first fluid outlet 66 and the second fluid outlet 68 are positioned transverse to the flow passage 72. The first fluid outlet 66 and/or the second fluid outlet 68 may also be at least partially aligned with the flow direction, for example the first fluid outlet 66 and/or the second fluid outlet 68 may be oriented at 45 degrees with respect to the flow passage 72.

In the example illustrated in FIG. 10 and FIG. 12, the flow passage 72 may be less than 20 mm wide. For example it may be less than 10 mm wide, for example less than 5 mm, for example less than 2 mm, for example less than 1.5 mm, for example less than 1 mm, for example less than 0.75 mm, for example less than 0.5 mm, for example less than 0.4 mm, for example less than 0.3 mm, for example less than 0.2 mm, for example less than 0.1 mm.

In the example illustrated in FIG. 10 and FIG. 12, the flow passage 72 may be at least 10 microns wide, for example at least 0.1 mm wide. For example it may be at least 0.2 mm, for example at least 0.3 mm, for example at least 0.4 mm, for example at least 0.5 mm, for example at least 0.75 mm, for example at least 1 mm, for example at least 1.5 mm, for example at least 2 mm, for example at least 5 mm wide.

The detector inlet may further comprise a mover that moves the gaseous fluid around the circulatory flow. The mover may be arranged to blow an additional flow of gaseous fluid, such as a jet, around the internal surface of a wall 70 of the flow passage 72 or plenum 57.

The detector inlet may further comprise a heater to heat the gaseous fluid in the plenum 57. The heater may be configured to heat the flow of fluid, for example to heat the gaseous fluid to vapourise aerosol carried by the flow. In an example the heater is positioned in the flow inlet, flow passage 72 and/or the plenum 57. The heater may comprise a resistive heater such as a filament heater, for example a membrane heater. Examples of heaters also include infrared light sources.

In the examples illustrated in FIG. 6 and FIG. 9, the flow inlet 54 has a smaller flow cross section area than the flow outlet 56. The flow inlet 54 may also have the same flow cross section as the flow outlet 56. In some examples it may have a larger flow cross section than the flow outlet 56.

In the example illustrated in FIG. 6 and FIG. 9 the circulatory flow circulates about a rotation axis that is transverse to the bulk flow direction. The circulatory flow may also circulate about a rotation axis that is in a direction other than transverse to the bulk flow direction, for example aligned to the bulk flow direction.

The detector inlets described herein are illustrated as being arrangements of conduits, such as hoses or pipes. As noted above however they may also be provided by channels, and plenums 57, which are cut into a block of material, and then enclosed. In such embodiments the flow passages 72 and inlets described herein may not have a circular cross section.

It should also be appreciated that particular combinations of the various features described and defined in any aspects of the invention can be implemented and/or supplied and/or used independently. Other examples and variations will be apparent to the skilled addressee in the context of the present disclosure.

In the examples illustrated above the flow of gaseous fluid from the first conduit and the second conduit induces a flow of fluid along the detector inlet past the sampling inlet 8 to the exhaust 12. The flow of gaseous fluid along the detector may also be induced by an air mover, for example a pump, a fan or any device suitable for drawing a flow of air through the inlet, such as bellows. The first conduit 2 and the second conduit 4 may each be provided by a channel cut into a block of material and enclosed, for example to provide a tubular flow path, the conduits may also be provided by a pipe or tube, for example a hose.

The invention claimed is:

1. A detector for detecting an aerosol, the detector comprising:

an analytical apparatus comprising at least one of an ion mobility spectrometer, a mass spectrometer, or a chromatography apparatus; and a detector inlet for providing a sample to the analytical apparatus, the detector inlet including:

an intake for inhaling a flow of gaseous fluid to be sampled by the analytical apparatus;

a mixing region;

a first conduit for carrying a first part of the flow of gaseous fluid from the intake to the mixing region;

a second conduit for carrying a second part of the flow of gaseous fluid from the intake to the mixing region;

a heater coupled with the first conduit and configured to heat the first part of the flow such that a temperature of the first part of the flow entering the mixing region is higher than a temperature of the second part of the flow entering the mixing region, wherein the detector inlet is configured to combine the first part of the flow entering the mixing region with the second part of the flow entering the mixing region, and wherein the temperature of the first part of the flow entering the mixing region is sufficient to vaporize in the mixing region an aerosol carried in the second part of the flow entering the mixing region; and a sampling inlet arranged to collect samples of the gaseous fluid from a sampling volume in the mixing region and to provide the samples to the analytical apparatus.

2. The detector of claim 1, further comprising a filter configured to remove at least some particulates from the first part of the flow of gaseous fluid.

3. The detector of claim 2, wherein the filter comprises a mesh configured to inhibit passage of particulates having a size greater than 0.5 micron.

4. The detector of claim 1, wherein the heater is configured so that a temperature of a gaseous fluid in the mixing region is in the range of 100° C. to 400° C.

5. The detector of claim 1, wherein at least one of the first conduit or the second conduit is configured to provide a circulatory flow of gaseous fluid in the mixing region.

6. The detector of claim 1, further comprising a controller configured to control the heater based on a sensed temperature of the inhaled flow of gaseous fluid.

7. The detector of claim 1, wherein the gaseous fluid in the sampling volume includes particulates carried by the gaseous fluid.

8. The detector of claim 7, further comprising a plenum encircling the sampling inlet, wherein the mixing region is arranged in the plenum.

9. The detector of claim 8, wherein a flow director is provided by a curved wall of the plenum, wherein the flow director is arranged to create circulatory flow of the gaseous fluid in the plenum, the curved wall of the plenum arranged so that the circulatory flow follows an internal surface of the curved wall of the plenum.

10. The detector of claim 8, wherein the plenum is arranged to direct the flow of gaseous fluid in a flow direction and is configured so that the circulatory flow circulates about an axis of rotation that is aligned with the flow direction.

11. The detector of claim 10, wherein the plenum comprises a cylinder and the axis of rotation is aligned with a longitudinal axis of the cylinder.

12. The detector of claim 11, wherein a flow director comprises is provided by a flow inlet to the plenum and a flow outlet from the plenum, and the flow inlet and the flow outlet are spaced apart in the direction of a longitudinal axis of the cylinder.

13. The detector of claim 8, wherein a flow director comprises is provided by a structure aligned with a helical path in the plenum.

14. The detector of claim 8, wherein the plenum is arranged to direct the flow of gaseous fluid in a flow direction and so that the circulatory flow circulates about an axis of rotation that is transverse to the flow direction.

15. The detector of claim 14, wherein a flow director is provided by a flow inlet to the plenum and a flow outlet from the plenum wherein the flow outlet is aligned to carry flow in a direction that is transverse to a direction of flow into the plenum from the inlet, and wherein the flow outlet is configured so that flow through the flow outlet is slower than flow through the flow inlet.

16. The detector of claim 8, wherein a flow director is provided by a mover arranged to provide the circulatory flow.

17. The detector of claim 1, wherein the heater is configured to heat the first part of the flow to a temperature of at least 150° C.

18. A detector for detecting an aerosol, comprising:

an analytical apparatus comprising at least one of an ion mobility spectrometer, a mass spectrometer, or a chromatography apparatus; and a detector inlet for providing a sample to the analytical apparatus, the detector inlet including:

a source of a flow of gaseous fluid to be sampled by the analytical apparatus;

an intake for inhaling the flow of gaseous fluid to be sampled by the analytical apparatus;

a mixing region;

a first conduit for carrying a first part of the flow of gaseous fluid from the intake to the mixing region;

a second conduit for carrying a second part of the flow of gaseous fluid from the intake to the mixing region, the first part of the flow of gaseous fluid and the second part of the flow of gaseous fluid exiting from the first conduit and the second conduit, respectively, to recombine in the mixing region;

a heater coupled with the first conduit and configured to heat the first part of the flow entering the mixing region such that a temperature of the first part of the flow is higher than a temperature of the second part of the flow entering the mixing region, wherein the detector inlet is configured to combine the first part of the flow entering the mixing region with the second part of the flow entering the mixing region, and wherein the temperature of the first part of the flow entering the mixing region is sufficient to vaporize in the mixing region an aerosol carried in the second part of the flow entering the mixing region; and a sampling inlet arranged to collect samples of the gaseous fluid from a sampling volume in the mixing region and to provide the samples to the analytical apparatus.

19. The detector of claim 18, wherein the source of the flow of gaseous fluid comprises a gaseous fluid from an environment.

20. A detector comprising:

an analytical apparatus for detecting a substance of interest, the analytical apparatus comprising at least one of an ion mobility spectrometer, a mass spectrometer, or a chromatography apparatus; and a detector inlet arranged to provide samples of a gaseous fluid to the analytical apparatus, the detector inlet comprising:

an intake for inhaling a flow of the gaseous fluid to be sampled by the analytical apparatus;

a mixing region;

a first conduit for carrying a first part of the flow of the gaseous fluid from the intake to the mixing region;

a second conduit for carrying a second part of the flow of the gaseous fluid from the intake to the mixing region, the first part of the flow of gaseous fluid and the second part of the flow of gaseous fluid exiting from the first conduit and the second conduit, respectively, to recombine in the mixing region;

a heater coupled with the first conduit and configured to heat the first part of the flow of the gaseous fluid such that a temperature of the first part of the flow entering the mixing region is higher than the temperature of a second part of the flow of the gaseous fluid entering the mixing region, wherein the detector inlet is configured to combine, in the mixing region, the first part of the flow of the gaseous fluid entering the mixing region with the second part of the flow of the gaseous fluid entering the mixing region, and wherein the temperature of the first part of the flow entering the mixing region is sufficient to vaporize in the mixing region an aerosol carried in the second part of the flow entering the mixing region;

a sampling inlet arranged to collect the samples of the gaseous fluid from a sampling volume in the mixing region and to provide the samples to the analytical apparatus, wherein the gaseous fluid in the sampling volume includes particulates carried by the gaseous fluid, and wherein the mixing region is arranged in a plenum containing the sampling volume and the sampling inlet, the plenum encircling the sampling inlet; and a flow director arranged to create circulatory flow of the gaseous fluid in the plenum.

* * * * *